Patented Sept. 21, 1943

UNITED STATES PATENT OFFICE 2,329,979

PREPARATION OF TETRA-CARBOXYLIC DI-ANHYDRIDES

Lewis W. Butz, Beltsville, Md., assignor to Claude R. Wickard, as Secretary of Agriculture of the United States of America and to his successors in office No Drawing. Application October 23, 1940, Serial No. 362,420

7 Claims. (Cl. 260—239.5)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

The present invention relates to polycyclic organic compounds, such as non-benzenoid steroids, and to processes of preparing them.

This invention is based on the discovery that organic compounds belonging to the class of 1,5-diene-3-ynes, i. e. compounds containing the atomic grouping

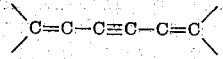

react with two moles of maleic anhydride to form stable addition products which contain two carbon rings more than are contained in the dieneyne employed. The molecular weight of these products is equal to the sum of the molecular weight of the dieneyne employed and twice the molecular weight of maleic anhydride.

Thus the dieneyne, cyclohexenylcyclopentenylacetylene

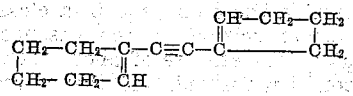

reacts readily with maleic anhydride. By this reaction there is formed a compound containing four rings of carbon atoms having substantially the structure:

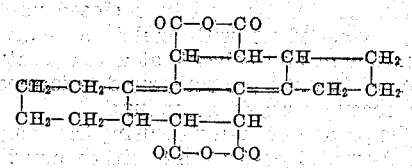

This is a non-benzenoid steroid. It possesses the seventeen-carbon four-ring skeleton common to all the steroids which have been found in organic materials. Furthermore it is a steroid containing only hydrogenated rings and one novel feature of the process is its capacity to yield polycyclic compounds lacking any aromatic (benzenoid) ring.

Diels and Alder (U. S. 1,944,731; Jan. 23, 1934) have previously found that one molecule of maleic anhydride (and many other compounds containing the atomic grouping

will react with one molecule of compounds containing a system of conjugated carbon to carbon double bonds to give addition products. My process differs from that of Diels and Alder in two respects: (1) Two molecules of maleic anhydride are added to one molecule of the other reactant. (2) The other reactant is a 1,5-diene-3-yne. This type does not contain a system of conjugated carbon to carbon double bonds.

The discovery of Dane and co-workers (Annalen der Chemie, 532, 39–51 (1937) and 536, 183–196 (1938)) should also be noted. They found that one molecule of compounds containing the atomic grouping —C=C—C≡CH could be added to one molecule of maleic anhydride (or other compound containing the grouping

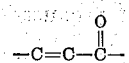

or

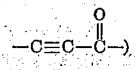

It is evident that the Dane reaction also differs from my process.

There is one more pertinent recorded discovery. Blomquist and Marvel (J. Am. Chem. Soc. 55, 1655–1662 (1933)) observed that approximately two molecules of maleic anhydride could be added to one molecule of a 1,5-diene-3-yne. Their products, however, were amorphous materials of undetermined structure.

All known processes for the synthesis of steroids relate to the preparation of benzenoid steroids. But the majority of the naturally occurring steroids, among them the therapeutically important male hormones, adrenocortical hormones, and progesterone are non-benzenoid.

My process makes available, for the first time, by synthesis, steroids of the non-benzenoid type, as well as non-steroid types of polycyclic compounds, which are useful as intermediates in the synthesis of therapeutic compounds.

My invention may be practiced by any of the procedures illustrated in the following examples. While I cite the use of a sealed glass tube, it is to be understood that I may use any type of container that will permit the development of pressure during heating and that will exclude the presence of atmospheric oxygen. I may use also, under certain conditions, any open type vessel.

EXAMPLE 1.—*1,5-dimethyl-2,3,4,6,7,8-hexahydronaphthalene-3,4,7,8-tetracarboxylic-3,4; 7,8-dianhydride*

One molecular proportion of 2,5-dimethyl-1, 5-hexadiene-3-yne (diisopropenylacetylene) is mixed with two molecular proportions of maleic anhydride and the mixture is heated, suitably in a sealed glass tube, at 130° C. for 1–5 hours. On cooling, with or without the addition of a solvent, such as acetone, ethyl acetate, or benzene, the product:

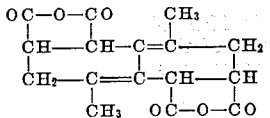

separates in high yield as colorless crystals. The melting point of the pure compound lies about 262–263° C. It has the empiric composition $C_{16}H_{14}O_6$. When heated with water it gradually dissolves to give an acid solution. When heated with ethanol it gives a tetraethyl ester, $C_{24}H_{34}O_8$. When heated with palladium and charcoal it gives, among other products, 1,5-dimethylnaphthalene. Observation of the absorption spectrum indicates that the two double bonds are at the positions shown in the structural formula.

EXAMPLE 2.—*8(14), 9-steradiene-6,7,11,12-tetracarboxylic-6,7; 11,12-dianhydride*

One molecular proportion of cyclohexenylcyclopentenylacetylene is mixed with two molecular proportions of maleic anhydride and heated as described in Example 1. The product which is isolated in the same manner as in Example 1 after purification melts at about 249–251° C. When heated with palladium and charcoal it yields, among other products, 15,16-dihydro-17-cyclopenta [*a*] phenanthrene The carbon skeleton is thus demonstrated to be that found in the natural steroids. The empiric composition is $C_{21}H_{20}O_6$. The absorption spectrum is similar to that observed for the product described in Example 1. The probable structure of this product is therefore that shown by the structural formula set forth in the introductory part of these teachings.

EXAMPLE 3.—*1,2,3,4,5,6,6a,7,8,9,10,11,12,12a-tetradecahydrochrysene - 5,6,11,12 - tetracarboxylic-5,6; 11,12-dianhydride*

A preferable name for this product, though one not yet sanctioned by usage, employs the numbering in use with steroids, viz., 8(14),9-chrysitadiene-6,7,11,12-tetracarboxylic-6,7; 11,12-dianhydride.

One molecular proportion of dicyclohexenylacetylene and two molecular proportions of maleic anhydride were heated together and the product isolated as in the previous examples. The product melts at 254–256° C., and has the empiric composition $C_{22}H_{22}O_6$. It has substantially the structure:

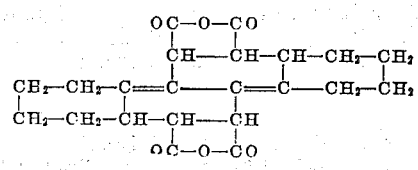

Having thus described my invention, what I claim for Letters Patent is:

1. The 1,5 - dimethylhexahydronaphthalene-3,4,7,8-tetracarboxylic-3,4; 7,8-dianhydride having substantially the structure:

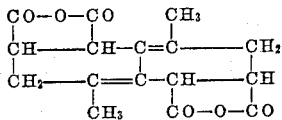

and consisting of colorless crystals having a melting point of substantially 262° C.

2. The steradiene-6,7,11,12-tetracarboxylic-6,7; 11, 12-dianhydride having substantially the structure:

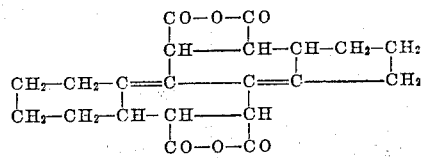

and consisting of colorless crystals having a melting point of substantially 250° C.

3. The tetradecahydrochrysene-5,6,11,12-tetracarboxylic-5,6; 11,12-dianhydride having substantially the structure:

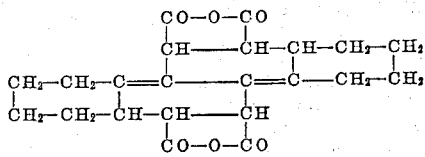

and consisting of colorless crystals having a melting point of substantially 255° C.

4. The process of manufacturing a nonbenzenoid fused polycyclic compound chosen from the group consisting of 1,5-dimethyl-2,3,4,6,7,8 - hexahydronaphthalene-3,4,7,8 - tetracarboxylic-3,4; 7,8-dianhydride 8(14), 9-steradiene-6,7,11,12-tetracarboxylic-6,7; 11,12 - dianhydride; 1,2,3,4,5,6,6a,7,8,9,10,11,12,12a-tetradecahydrochrysene - 5,6,11,12-tetracarboxylic-5,6; 11, 12-dianhydride, from the corresponding dieneyene chosen from the group consisting of diisopropenylacetylene, cyclohexenylcyclopentenylacetylene, dicyclohexenylacetylene, respectively, comprising heating the dieneyene in a closed vessel with maleic anhydride, in the absence of any solvent, at a temperature of about 130° C. until the compound is formed, and thence recovering said compound.

5. The process of manufacturing the compound 1,5 - dimethyl-2,3,4,6,7,8-hexahydronaphthalene-3,4,7,8-tetracarboxylic-3,4; 7,8 - dianhydride, comprising heating in a closed vessel diisopropenylacetylene with maleic anhydride, in the absence of any solvent, at a temperature of about 130° C. until the compound is formed, and thence recovering said compound.

6. The process of manufacturing the compound 8(14), 9-steradiene-6,7,11,12-tetracarboxylic-6,7; 11,12-dianhydride, comprising heating in a closed vessel cyclohexenylcyclopentenylacetylene with maleic anhydride, in the absence of any solvent, at a temperature of about 130° C. until the compound is formed, and thence recovering said compound.

7. The process of manufacturing the compound 1,2,3,4,5,6,6a,7,8,9,10,11,12,12a - tetradecahydrochrysene-5,6,11,12,-tetracarboxylic-5,6; 11,12-dianhydride, comprising heating in a closed vessel dicyclohexenylacetylene with maleic anhydride, in the absence of any solvent, at a temperature of about 130° C. until the compound is formed, and thence recovering said compound.

LEWIS W. BUTZ.